United States Patent
Luo

(10) Patent No.: US 11,003,719 B2
(45) Date of Patent: May 11, 2021

(54) METHOD AND APPARATUS FOR ACCESSING A STORAGE DISK

(71) Applicant: HUAWEI TECHNOLOGIES CO., LTD., Guangdong (CN)

(72) Inventor: Xiong Luo, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 15/484,152

(22) Filed: Apr. 11, 2017

(65) Prior Publication Data

US 2017/0220699 A1 Aug. 3, 2017

Related U.S. Application Data

(63) Continuation of application No. PCT/CN2014/088351, filed on Oct. 11, 2014.

(51) Int. Cl.

| | |
|---|---|
| *G06F 16/903* | (2019.01) |
| *G06F 16/00* | (2019.01) |
| *H04L 29/08* | (2006.01) |
| *G06F 3/06* | (2006.01) |

(52) U.S. Cl.
CPC ........ *G06F 16/90335* (2019.01); *G06F 3/061* (2013.01); *G06F 3/067* (2013.01); *G06F 3/0635* (2013.01); *G06F 3/0644* (2013.01); *G06F 16/00* (2019.01); *H04L 67/1097* (2013.01)

(58) Field of Classification Search
CPC ......... G06F 17/30979; G06F 16/90335; G06F 16/00; G06F 3/061; G06F 3/0635; G06F 3/0644; G06F 3/067; H04L 67/1097
See application file for complete search history.

(56) References Cited

U.S. PATENT DOCUMENTS

| | | | | |
|---|---|---|---|---|
| 7,752,392 | B1 * | 7/2010 | Roy | G06F 3/061 370/402 |
| 7,876,752 | B1 * | 1/2011 | Rimmer | H04L 45/54 370/389 |
| 8,793,250 | B1 * | 7/2014 | Gorde | G06F 16/2291 707/737 |
| 2009/0307388 | A1 * | 12/2009 | Tchapda | G06F 3/067 710/33 |
| 2010/0030995 | A1 * | 2/2010 | Wang | G06F 16/2282 711/173 |

(Continued)

FOREIGN PATENT DOCUMENTS

| | | |
|---|---|---|
| CN | 101374087 A | 2/2009 |
| CN | 102799628 A | 11/2012 |

(Continued)

*Primary Examiner* — June Y Sison
*Assistant Examiner* — Steven C Nguyen
(74) *Attorney, Agent, or Firm* — Leydig, Voit & Mayer, Ltd.

(57) ABSTRACT

The application provides a data writing/reading method. A switching device receives a key-value packet from a server, acquires a partition number, queries a partition view to obtain a storage disk address corresponding to the partition number, and converts the key-value packet into a storage disk packet by changing a destination address of the key-value packet to the storage disk address. The switching device sends the storage disk packet to a storage disk corresponding to the storage disk address.

21 Claims, 5 Drawing Sheets

(56) References Cited

U.S. PATENT DOCUMENTS

| | | | | |
|---|---|---|---|---|
| 2010/0198889 A1* | 8/2010 | Byers | ...................... | G06F 3/067 |
| | | | | 707/827 |
| 2010/0281027 A1* | 11/2010 | Duan | ................ | G06F 16/24554 |
| | | | | 707/737 |
| 2013/0275656 A1* | 10/2013 | Talagala | .............. | G06F 12/0246 |
| | | | | 711/103 |
| 2015/0049764 A1* | 2/2015 | Hieda | ...................... | H04L 45/44 |
| | | | | 370/392 |
| 2016/0050146 A1* | 2/2016 | Henderson | .......... | H04L 67/1097 |
| | | | | 370/392 |

FOREIGN PATENT DOCUMENTS

| | | |
|---|---|---|
| CN | 102968498 A | 3/2013 |
| CN | 102968503 A | 3/2013 |
| CN | 103092885 A | 5/2013 |
| WO | 2013147175 A1 | 10/2013 |

\* cited by examiner

METHOD AND APPARATUS FOR ACCESSING A STORAGE DISK

REFERENCE TO RELATED APPLICATIONS

This application is a continuation of International Application No. PCT/CN2014/088351, filed on Oct. 11, 2014, the disclosure of which is hereby incorporated by reference in its entirety.

TECHNICAL FIELD

The present application relates to data processing technologies, and in particular, to a data processing method and apparatus.

BACKGROUND

With the development of the society, scale of data that needs to be stored and managed is becoming larger and larger, and the data is even called mass data. When an extremely large scale of data is managed in a conventional centralized storage manner, it is difficult to provide high-efficient read-write operations, and it is difficult to meet requirements of good scalability and high availability.

Under this background, a storage system jointly constructed by multiple physical storage nodes (referred to as physical nodes in this application) emerges, and each storage node can provide storage space. This storage manner is called distributed storage. A distributed storage manner is called key-value storage. In key-value storage, data (or a fragment of data) that is stored is called a value, and each piece of data has a unique identifier within a range of the whole storage system, where the identifier is a key, and the key and the value are in a one-to-one correspondence. For example, if data in a disk sector needs to be accessed, a key may be "file label+logical block address (LBA)", and a value is data that is recorded in the sector, where a data size is, for example, 512 bytes.

A key and a value of a same piece of data are called a key-value as a whole, which is referred to as a K-V. Each key-value is stored on a physical node of the storage system. For a specific key-value, a physical node that stores the key-value may be determined by using a mapping rule, where the mapping rule is established according to a hash value generated by performing a hash operation on a key, and then the hash value and the physical node are mapped. Based on this method, if calculated hash values of two different keys are the same, key-values corresponding to the two keys are definitely stored on a same physical node.

In addition, quantity of physical nodes is generally fixed; however, quantity of key-values is not fixed, and usually exceeds the quantity of physical nodes. Therefore, a same physical node is allowed to store multiple key-values that have different keys. That is, if calculated hash values of two different keys are different, it is also possible that key-values corresponding to the two keys are stored on a same physical node.

A hash value calculated according to a key falls within an integer interval of $[0, 2^{32}-1]$. During system initialization, segmentation is performed on this large-range integer interval, so that the integer interval is divided into multiple partitions whose interval sizes are the same or similar, and quantity of hash values in each partition is basically the same. For example, a whole interval is divided into two partitions, that is, partition 1 and partition 2; then, an interval represented by the partition 1 is $[0, 2^{32}/2]$ and an interval represented by the partition 2 is $[^{32}/2+1, 2^{32}-1]$.

A physical node includes a storage medium, and may further include components such as a memory and a central processing unit (CPU). A virtual storage node is differentiated from a physical storage node, and is a logical division of the storage space of the physical node. Each physical node may be virtualized into one or more virtual nodes; and in some cases, multiple physical nodes may also be virtualized into one virtual node; or each partition is corresponding to one virtual node. After receiving a new key-value, a storage system selects, according to a partition within which a hash value of a key of the key-value falls, a virtual node corresponding to the partition to store the key-value.

In a network topology, a service host is connected to a server, and it writes data into a storage medium by using the server. Therefore, the server needs to record a mapping table (also called a partition view) that records a mapping relationship between a partition and a physical node, so that the load of the server is heavy and operations are complex.

SUMMARY

The present application provides a data processing technology, which can reduce load of a server and operation complexity.

According to a first aspect, the present application provides a data processing method, including: receiving, by a switching device, a key-value packet sent by a server, where a destination address of the key-value packet is a partition number; obtaining, by the switching device, the partition number from the key-value packet, and querying a partition view to obtain a storage disk address corresponding to the partition number, where a correspondence between the partition number and the storage disk address is recorded in the partition view; converting the key-value packet into a storage disk packet by changing the destination address of the key-value packet to the storage disk address; and sending, by the switching device, the storage disk packet to a storage disk corresponding to the storage disk address.

According to a second aspect, the present application provides a data switching apparatus, including: a receiving module, configured to receive a key-value packet, where a destination address of the key-value packet is a partition number; a querying module, configured to obtain the partition number from the key-value packet, and query a partition view to obtain a storage disk address corresponding to the partition number, where a correspondence between the partition number and the storage disk address is recorded in the partition view; a packet converting module, configured to convert the key-value packet into a storage disk packet by changing the destination address of the key-value packet to the storage disk address; and a sending module, configured to send the storage disk packet to a storage disk corresponding to the storage disk address.

According to a third aspect, the present application provides a data write system, including a server and the switching device according to the second aspect of the present application, where the key-value packet is a data key-value packet; and the server is configured to: calculate, according to a data key algorithm, a data key corresponding to the data value, obtain a data partition number of the data value according to a partition number algorithm, generate the data key-value packet, and send the data key-value packet to the switching device, where a destination address of the data key-value is the data partition number, and a payload of the data key-value packet carries the data key and the data value.

According to a fourth aspect, the present application provides a data write system, including a server and a switching device. The server is configured to: calculate, according to a data key algorithm, a data key corresponding to the data value, obtain a data partition number of the data value according to a partition number algorithm, generate the data key-value packet, and send the data key-value packet to the switching device, where a destination address of the data key-value packet is the data partition number, and a payload of the data key-value packet carries the data key and the data value; the switching device is connected to the server, and is configured to receive a key-value packet sent by the server; the switching device is further configured to obtain the data partition number from the data key-value packet, and query a partition view to obtain a data storage disk address corresponding to the partition number, where a correspondence between the data partition number and the data storage disk address is recorded in the partition view; the switching device is further configured to convert the data key-value packet into a data storage disk packet by changing the destination address of the data key-value packet to the data storage disk address; and the switching device is further configured to send the data storage disk packet to a data storage disk corresponding to the data storage disk address.

According to a fifth aspect, the present application provides a switching device, including: an interface, configured to provide an external connection; a computer readable medium, configured to store a computer program; and a processor, connected to the interface and the computer readable medium. The processor is configured to perform, by running the program, the following steps: receiving a key-value packet, where a destination address of the key-value packet is a partition number; obtaining the partition number from the key-value packet, and querying a partition view to obtain a storage disk address corresponding to the partition number, where a correspondence between the partition number and the storage disk address is recorded in the partition view; converting the key-value packet into a storage disk packet by changing the destination address of the key-value packet to the storage disk address; and sending the storage disk packet to a storage disk corresponding to the storage disk address.

According to a sixth aspect, the present application provides a data write system, including a switching device and a server. The server is configured to: calculate, according to a data key algorithm, a data key corresponding to the data value, obtain a data partition number of the data value according to a partition number algorithm, generate the data key-value packet, and send the data key-value packet to the switching device, where a destination address of the data key-value packet is the data partition number, and a payload of the data key-value packet carries the data key and the data value. The switching device is connected to the server, and is configured to: receive the data key-value packet; obtain the data partition number from the data key-value packet, and query a partition view to obtain a data storage disk address corresponding to the data partition number, where a correspondence between the partition number and the data storage disk address is recorded in the partition view; convert the data key-value packet into a data storage disk packet by changing the destination address of the data key-value packet to the data storage disk address; and send the data storage disk packet to a data storage disk corresponding to the data storage disk address.

By applying the solutions of the present application, a key-value packet uses a partition number as a destination address, partition view and server are separated, and a switching device performs packet conversion. Data processing efficiency of the server is improved, and load of the server and operation complexity are reduced. In addition, network bandwidth of a whole storage system can be reduced.

DESCRIPTION OF EMBODIMENTS

Figure 1:
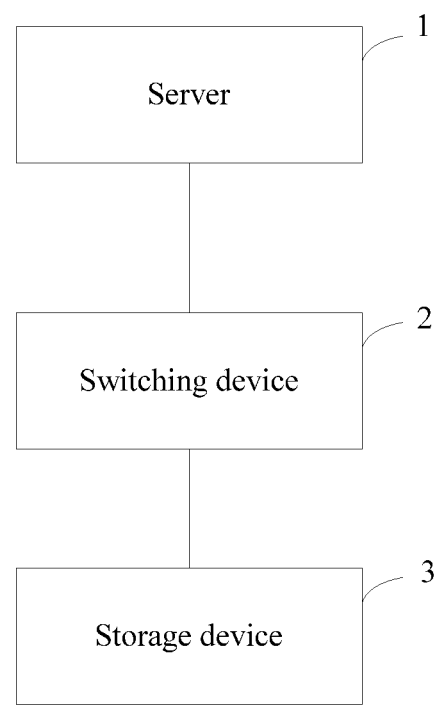
FIG. 1 is a topology diagram of a storage system according to an embodiment of the present application.

The following describes the technical solutions in the present application with reference to the accompanying drawings.

Key-value storage is a distributed storage manner, and a storage object is a key-value. In key-value storage, multiple key-values may be dispersedly stored in multiple storage disks.

Following terms may appear in the description of embodiments of the present application.

(1) Key-value: including two parts of information, that is, a value and a key, where the value part is data itself, and the key is an index of the value. The key and the value are in a one-to-one correspondence, and a corresponding value can be found by using a key.

(2) Metadata: description information of data, and also called data of the data. For example, the metadata may be an index of the data. In the embodiments of the present application, and without special explanation, "data" specifically refers to an object that is described by the metadata, but it does not include the metadata. Data value: data itself. Data key: a label of a data value in key-value storage. Metadata value: metadata itself. Metadata key: a label of a metadata value in key-value storage. Like both the data key and the metadata key are keys, both the data value and the metadata value are values.

(3) Key-value packet: a packet in a new packet format; a key-value packet differs from an internet protocol (IP) packet in that a destination address is a partition number. The packet is marked as a key-value packet in a frame type field. Other parts of the packet may be the same as the IP packet.

(4) Data key-value packet: a type of key-value packet, payload of which carries a data key and a data value. The data key-value packet can be used to store a key-value in a storage disk.

(5) Metadata key-value packet: a type of key-value packet, payload of which carries a metadata key and a metadata value. The metadata key-value packet can be used to store a key-value in a storage disk.

(6) Data request key-value packet: a type of key-value packet, payload of which carries a data key. The data request key-value packet is sent to a switching device by a server, and it can be used to request a data value corresponding to the key in the payload.

(7) Metadata request key-value packet: a type of key-value packet, payload of which carries a metadata key. The metadata request key-value packet is sent to a switching device by a server, and it can be used to request a metadata value corresponding to the key in the payload.

(8) Storage disk: a storage device, which may use a flash memory, a magnetic disk, or a magnetic tape as a storage medium, and may use an IP interface or another interface as an external interface. When an IP interface is used, the storage disk is also called an IP disk. The IP disk has a CPU and a memory. Therefore, the IP disk has certain processing capabilities, and, to some extent, the IP disk is equivalent to a combination of a storage controller and a storage medium.

(9) Storage disk packet: a packet that can be recognized by a storage disk. When the storage disk is an IP disk, the storage disk packet is an IP packet. A payload of a metadata storage disk packet is the same as that of a metadata key-value packet; and a difference lies in that destination addresses are different. A destination address of the storage disk packet is an address that can be recognized by the storage disk, while a destination address of the metadata key-value packet is a partition number. In addition, label fields are also different, and the storage disk packet and the key-value packet may be distinguished by using a labeling device. A data storage disk packet is similar to a metadata storage disk packet, and a difference lies in that payloads are different.

(10) Data response storage disk packet: a type of storage disk packet and a response packet of a data request storage disk packet, where a payload of the data response storage disk packet carries a data value requested by a data request key-value packet.

(11) Metadata response storage disk packet: a type of storage disk packet and a response packet of a metadata request storage disk packet, where a payload of the metadata response storage disk packet carries a metadata value requested by a metadata request key-value packet.

Figure 2:
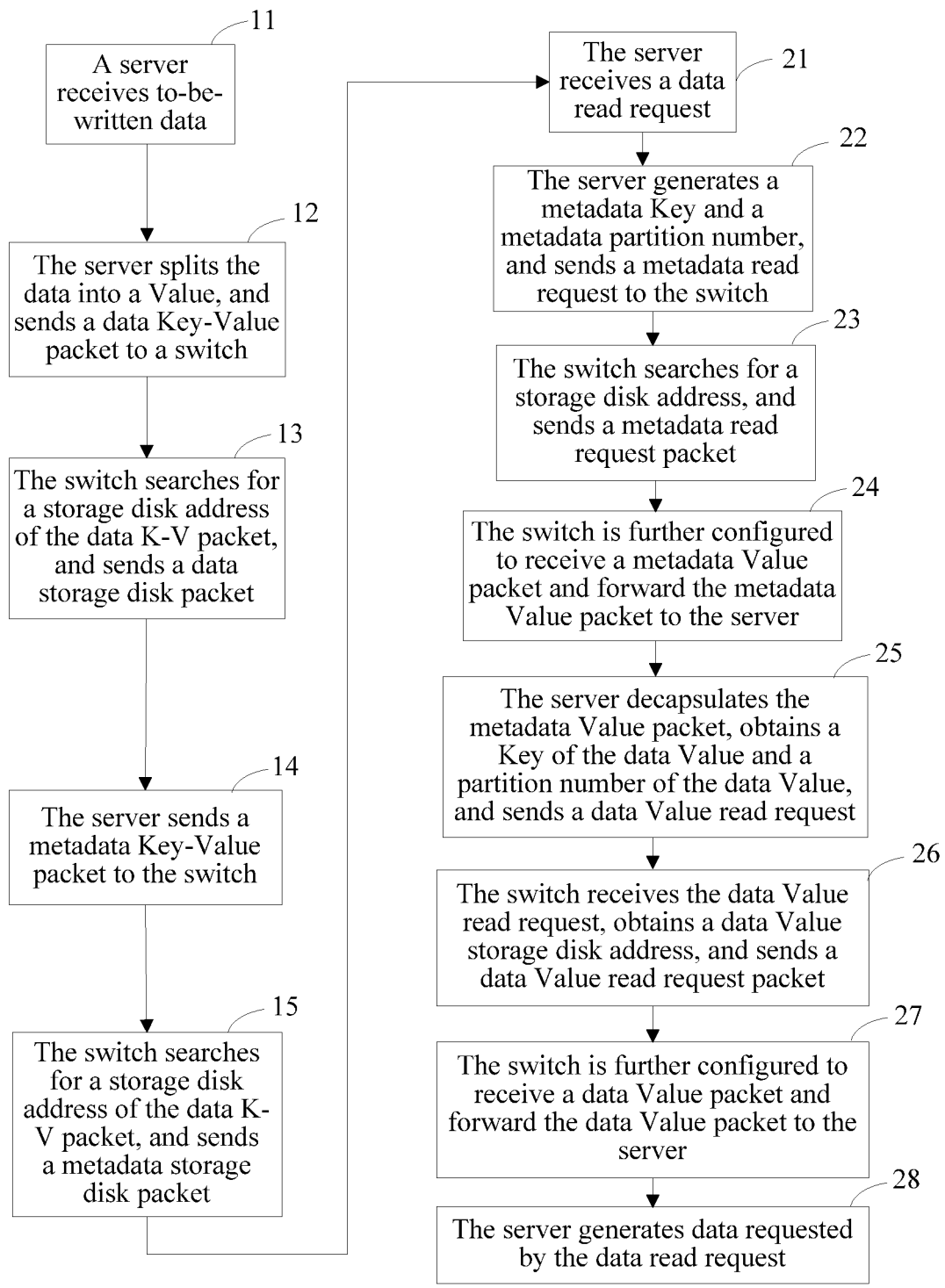
FIG. 2 is a flowchart of a data write method and a data read method according to an embodiment of the present application.

An embodiment of the present application provides a data writing method and a data reading method, which may be used in a storage system that includes a server and a switching device. As shown in FIG. 1, one end of a server 1 is connected to a switching device 2, and the other end of the switching device 2 may be connected to a storage device 3, where the storage device 3 is, for example, a memory, or a storage array formed by memories. FIG. 2 is a data writing method and a data reading method that are based on this system, and the two methods are independent from each other. The switching device 2 is, for example, a switch, or a switch that has a routing function.

By applying the solution provided in the present application, when data is read or written, the server 1 does not need to query a partition view, reducing resource occupation of the server 1. In addition, during system initialization, or when a storage device is added or deleted in the system, the partition view needs to be sent to each switching device, so that read access or write access can be performed on the storage device. Normally, quantity of the servers 1 is much greater than quantity of the switching devices 2. A data volume required for distributing the partition view to all the servers 1 is much greater than a data volume required for distributing the partition view to all the switching devices 2. After the partition view is no longer stored on the server 1, the data volume required for distributing the partition view is greatly reduced.

In addition, in the existing technology, a server and a switch use an IP protocol to communicate. When data is stored, the server needs to know a storage disk address, so that the data can be read, and the switch is used as only a transit device. However, in this embodiment of the present application, a key-value packet is used in communication between each server 1 and each switching device 2, and the server 1 only needs to calculate a partition number of the key-value packet, but does not need to learn a storage disk address. On one hand, according to this embodiment of the present application, resource occupation of the server is reduced; on the other hand, because the server 1 does not have the storage disk address, security of a whole storage system is also enhanced, and the storage disk address cannot be obtained by intruding into the server 1.

Still further, in a scenario of multiple copies, a same copy needs to be stored in different storage devices. In the prior art, when data is written, a server needs to send multiple identical copies to a switch, and then the switch forwards the multiple same copies one by one to corresponding memories. In this embodiment of the present application, when data is written, the server 1 may send only one copy to the switching device 2, and the switching device 2 generates multiple copies and then forwards the multiple copies to memories. According to the technology provided in this embodiment of the present application, a quantity of packets sent between the server 1 and the switching device 2 is reduced.

The server 1 may receive data from an external host, and store the data into the storage device 3 by using the switching device 2; or read data from the storage device 3 by using the switching device 2.

The switching device 2 can support an open system interconnection (OSI) layer 2 protocol, and for example, is a switch; or the switching device 2 can simultaneously support an OSI layer 2 protocol and an OSI layer 3 protocol, and for example, is a combination of a switch and a router.

The storage device 3 is configured to store data. Each storage device 3 includes one or more partitions, where the partition is a logical concept.

An embodiment of the data writing method includes the following steps:

11. A server receives to-be-written data.

The to-be-written data may be, for example, a complete file, or a data stream, or may be a part of a file or a part of a data stream.

12. The server splits the to-be-written data into one or more fragments, where a fragment is also called a data value; obtains a data key of each data value according to a data key algorithm; obtains a partition number of each data value according to a partition number algorithm; generates a data key-value packet of the data value by using the partition number as a destination address; and sends the data key-value packet to a switching device, where a payload of each data key-value packet carries the data key and a data value corresponding to the data key. A key-value packet may also be referred to as a K-V packet.

In this step, because these values are generated by splitting data sent by the server, the values are called data values. In the following, a value generated from a metadata is called a metadata value. The data value and the metadata value are collectively called a value.

For a concept of a partition number, reference may be made to a distributed hash table (DHT) technology. Hash space is evenly segmented into partitions according to a sequence, and a unique serial number is allocated to each hash space, where the serial number is a partition number.

The hash space may be a range of a value obtained by performing a hash operation (hash function) on a key.

For example, when the data is greater than 1 MB (mega bytes), the server splits the to-be-written data according to a granularity of 1 MB. Multiple data fragments are formed after the splitting, and each data fragment is also called a data value. An algorithm for obtaining a data key corresponding to a data value may be randomly set, which only needs to comply with a one-to-one correspondence between the data key and the data value. For example, a serial number provided by a third party may be used as a key of a value, or a key may be obtained by means of calculation according to a parameter of a value. A key may be considered as a label of a value and may uniquely identify the value.

Each partition number uniquely identifies a partition, and there is a correspondence between partitions and storage disks, for example, multiple partitions are corresponding to one storage disk. The partition number may be a number, or a letter, or a marking manner in another form. The partition number may also be called a partition address. There are also many methods for obtaining a partition number of each value, and it is only required that values are roughly allocated to partitions evenly. In a special case, unevenness is also accepted. One algorithms is: numbering the values, and making the values correspond to the partitions one by one.

For example, one algorithm may be: performing a hash operation on a key of a value; performing a taking remainder (REM) operation on an obtained hash value according to a total quantity of partitions owned by all storage disks; using a remainder as a partition number; and storing the value in a partition of a corresponding serial number according to a value of the remainder. For example, if the remainder is 3, the value is stored in a third partition, and a partition number of the partition may also be named a partition 3.

Another algorithm may be as follows: It is assumed that there are three partitions in total, which are partition 1, partition 2, and partition 3. A first value is stored in the partition 1, a second value is stored in the partition 2, a third value is stored in the partition 3, a fourth value is stored in the partition 1, a fifth value is stored in the partition 2, a sixth value is stored in the partition 3, a seventh value is stored in the partition 1, . . . , and so on. There is also another algorithm that uses a pseudorandom number to randomly specify a partition number for each value. It can be seen from statistics that values are also roughly corresponding to partition numbers evenly.

For example, it is assumed that a file name of the to-be-written data is aaa.doc, and a size of the to-be-written data is 9 MB, keys of nine data fragments that are obtained after splitting are aaa.doc-1, aaa.doc-2, aaa.doc-3, . . . , and aaa.doc-9, and the naming manner for the nine data fragments is a data key algorithm. It is assumed that there are four partitions, which are partition 1, partition 2, partition 3, and partition 4. A taking remainder (REM) operation is performed on hash values of the nine data keys according to a quantity of the partitions that is 4, where a hash value whose remainder is 1 is corresponding to the partition 1, a hash value whose remainder is 2 is corresponding to the partition 2, and so on.

In this step, a K-V packet sent to the switching device is a newly defined packet, which uses a partition number as a destination address; and a source address of the K-V packet may be an IP address of the server. In addition to that destination addresses are different, label fields used to distinguish the K-V packet from an IP packet are also different; and remaining fields of the K-V packet may be consistent with those of the IP packet.

The K-V packet is similar to the IP packet, and both belong to a network layer of an open system interconnection (OSI) model in a network protocol. A difference lies in that a 32-bit destination IP address is in the IP packet, but a partition number is in the KV packet, where the partition number may also be 32 bits. What is the same as the IP packet is that an upper-layer protocol of a protocol used by the K-V packet is the UDP (User Datagram Protocol) protocol and a lower-layer protocol is the MAC (Media Access Control) protocol. When the K-V packet is sent by the server to the switching device, the K-V packet is encapsulated into a MAC frame, where a source address of the MAC frame is a MAC address of the server, and a destination address of the MAC frame is a MAC address of the switching device or a broadcast address 0xFFFFFFFFFFFF. In a "frame type" field, the packet is marked as a K-V packet, so as to be distinguished from the IP packet. During real transmission, physical layer encapsulation further needs to be performed on the MAC frame.

13. The switching device receives the data K-V packet, and obtains, by querying a partition view, a storage disk address corresponding to the partition number of the data value; converts the data K-V packet into a data storage disk packet by using the storage disk address corresponding to the partition number of the data value as a destination address; and sends the data storage disk packet. A correspondence between the partition number and the storage disk address is recorded in the partition view, and the partition view may be stored on the switching device, and updated by using a controller that communicates with the switching device.

In this step, because the destination address of the data packet is the memory disk address, after the data storage disk packet is sent, a corresponding storage disk receives the data packet, and then stores a key and a value in the packet. Payloads of the data storage disk packet and the data K-V packet are the same.

The correspondence between the partition number and the storage disk address is recorded in the partition view. A working principle of the switching device is as follows: After receiving the key-value packet sent by the server, the switching device reads the partition number carried in the packet, and may obtain the storage disk address by querying the partition view. When a quantity of partitions is greater than a quantity of storage disks, multiple partitions may be corresponding to a same storage disk. The storage disk herein is a physical memory, for example, may be a magnetic disk, a solid state disk/solid state drive (SSD), or a recordable and erasable compact disc.

The address of the storage disk may be an IP address. It should be noted that, being similar to step 12, the switching device and the storage disk may be connected by using the Ethernet. If a packet sent by the switching device to the storage disk is an IP packet, because the TCP/IP (Transmission Control Protocol/Internet Protocol) protocol is not a bottom-layer protocol, in a practical solution, the IP packet needs to be encapsulated one more time, for example, encapsulated into an Ethernet frame, and then the Ethernet frame is sent to the storage disk. After receiving the Ethernet frame, the storage disk may obtain the IP packet by decapsulating the Ethernet frame. In addition to the Ethernet, a bearer protocol such as the asynchronous transfer mode (ATM) may be used to perform bottom-layer data transmission between the switching device and the storage disk. In an actual service, the Ethernet frame needs to be further encapsulated into a physical layer format to be sent to the storage disk.

Steps 12-13 introduce a process of sending the data key-value. It should be noted that, for a case in which a check fragment exists, for example, every five data fragments are corresponding to two check fragments, the check fragment is also sent according to a same operation as the data fragment. That is, in a case in which a check fragment exists, the data values mentioned in the steps in this method include two types, where one type is an original data value directly obtained by splitting data, and the other type is check information of the original data value. Because a check value is processed according a same process in which the original data value is processed, the check value and the original data value may not be distinguished and are collectively called a data value.

Each data key-value is stored according to a manner of step 13. After successfully storing the data key-value, the storage disk sends, to the switching device, a response message indicating a storage success; and the switching device sends, to the server, the response message indicating the storage success. After receiving the response message that is sent by the switching device and indicates the storage success, the server performs processing of a metadata key-value in steps 14-15.

The following introduces a process of sending the metadata key-value, where metadata is relative to data. After the data is split into data values, a metadata value is generated. The metadata value may record data values into which the data are split, that is, indexes of the data values, and record a sequence relationship of these data values in the data.

14. A metadata value may be obtained from data; the server obtains, according to a metadata key algorithm, a metadata key corresponding to the metadata value, and obtains a partition number of the metadata value according to a partition number algorithm, where the partition number of the metadata value is called a metadata partition number; generates a metadata K-V packet of the metadata value by using the metadata partition number as a destination address, and sends the metadata K-V packet to the switching device, where a payload of each metadata K-V packet carries the metadata key and a metadata value corresponding to the metadata key.

The metadata value records index information of the data value. If a size of metadata is smaller than that of the data value, the metadata does not need to be split. According to the foregoing example, for data whose file name is aaa.doc, a metadata key algorithm of the data may be: adding-metadata at the end of the file name, where a metadata key of the data may be aaa.doc-metadata. The metadata key algorithm may be different from the data key algorithm.

15. The switching device receives the metadata K-V packet, obtains, by querying the partition view, a storage disk address corresponding to the metadata partition number; converts the metadata key-value packet into a metadata storage disk packet by using the storage disk address corresponding to the metadata partition number as a destination address; and sends the metadata storage disk packet to a corresponding storage disk.

A process of sending the metadata is similar to a process of sending the data, that is, steps 14-15 are similar to steps 12-13, and a difference lies in that the data changes to the metadata; therefore, a detailed description is not provided again. For example, a manner for obtaining the partition number in step 14 may use any one of the three methods mentioned in step 12. The switching device may distinguish the K-V packet from another packet (for example, an IP packet) by reading a frame type field.

The data reading method is relatively independent of the data writing method. The following introduces an embodiment of the data reading method.

21. A server receives a data read request.

To-be-read data requested by the data read request may be, for example, a complete file, or a data stream, or may be a part of a file or a part of a data stream.

22. The server calculates a metadata key according to the data read request by using a metadata key algorithm; obtains a partition number of the metadata by using a partition number algorithm; generates the metadata read request key-value packet by using the partition number as a destination address, where a payload of the metadata read request key-value packet carries the metadata key; and sends a metadata read request to a switching device. The metadata key may also be called metadata of the metadata.

The data read request carries information about the to-be-read data, the metadata key is calculated according to the information about the to-be-read data by using the metadata key algorithm. The metadata key algorithm in this step may be the same as the metadata key algorithm in step 14. For example, the information about the to-be-read data is a file name of the to-be-read data; however, the metadata key algorithm is: adding a suffix-metadata at the end of the file name, and then a metadata key of to-be-read data whose file name is aaa.doc is aaa.doc-metadata.

An algorithm for obtaining a metadata partition number by the server is the same as that in step 12, that is, for a read request and a write request of a same piece of data, partition numbers calculated according to a preset partition number algorithm are the same. According to the foregoing example, a partition number may be obtained according to a key. For a read request of data whose file name is aaa.doc, in this step, because a rule for generating the metadata key is the same, a metadata key of the data is also aaa.doc-metadata. After the metadata key is obtained, one of the methods mentioned in step 12 may be used to obtain the metadata partition number. Certainly, the metadata partition number may be obtained by other means without using the key.

After the metadata partition number is obtained, the metadata partition number is placed in a metadata read request key-value packet header as a destination address, and the key is placed in the payload of the metadata read request key-value packet, so as to generate the metadata read request key-value packet. Content that the metadata read request key-value packet requests to obtain is a metadata value, and the server sends the read request to the switching device. A format of the metadata read request packet is the same as that of the K-V packet in step 12, and the metadata key is carried in the payload. Likewise, the packet needs to be encapsulated into a MAC frame, and even further to be converted into a physical signal to be sent to the switching device.

23. The switching device receives the metadata read request key-value packet; obtains, from a packet header, a metadata partition number that is used as the destination address; obtains, by querying a partition view, a storage disk address corresponding to the metadata partition number, so as to replace the destination address of the metadata read request key-value packet with the storage disk address corresponding to the metadata partition number, and then convert a read request of the metadata value into a metadata request storage disk packet; and sends the metadata request storage disk packet to a corresponding storage disk. A correspondence between the metadata partition number and the storage disk address corresponding to the metadata partition number is recorded in the partition view.

In this step, the destination address of the metadata read request key-value packet is the storage disk address, and the storage disk returns the metadata value to the switching device after receiving the metadata request packet. A format of a returned packet may be an IP packet format, and the metadata value is carried in a payload of the IP packet.

24. The storage disk sends a metadata response storage disk packet to the switching device; the switching device receives the metadata response storage disk packet and forwards the metadata response storage disk packet to the server. The packet forwarded by the switching device to the server may not use a K-V packet format, but uses the IP packet format. The metadata response storage disk packet is a response packet of the metadata request storage disk packet.

25. The server decapsulates the received metadata response storage disk packet; obtains a data key of each data value by using a metadata value carried in a payload of the metadata response storage disk packet; and obtains a data partition number of a partition that stores the data value; generates a data request key-value packet by using the data partition number as a destination address, where the data request key-value packet carries the data key; and sends the data request key-value packet to the switching device.

A specific method for obtaining the data key and the data partition number may be the same as that in step 22.

The metadata value carries a sequence of data values and indexes (such as a data key corresponding to a data value) of the data values. A partition number of a data value is obtained by using a data key, and an algorithm is the same as the algorithm mentioned in step 12.

The metadata value may also not carry the data key, but carries a parameter that can be used to obtain the data key, where the data key is obtained by means of calculation by the server. A specific algorithm for obtaining the data partition number by using the data key is the same as the algorithm mentioned in step 12. The metadata value may also directly carry the data partition number. In this way, a process in which the data partition number is obtained by means of calculation by using the data key may be omitted.

26. The switching device receives the data request key-value packet; obtains, by querying the partition view, a data value storage disk address corresponding to the data partition number; converts the data request key-value packet into a data request storage disk packet by using the storage disk address corresponding to the data partition number as a destination address; and sends the data request storage disk packet to a corresponding storage disk.

After receiving the data request storage disk packet, the storage disk searches for a data value corresponding to the data key, and returns a found data value to the switching device by carrying the found data value in a payload of an IP packet, where the IP packet is called a data response storage disk packet.

A technical principle of this step is similar to that of step 23, and a difference lies in that the metadata value is acquired in step 23, but an acquiring object in this step is the data value.

27. The switching device is further configured to receive a data response storage disk packet and forward the data response storage disk packet to the server.

28. The server is further configured to decapsulate the data response storage disk packet, and combine multiple data values into the to-be-read data requested by the data read request.

After scraping up all data fragments that form the to-be-read data, the server sequentially combines, according to sequence information of the data fragments that is recorded in the metadata value, these data fragments to form the to-be-read data, and returns the to-be-read data to a requester.

In the foregoing method, for a key-value packet, in addition that a destination address is a partition number, a dedicated field is used in a packet header to mark that the packet is a key-value packet, so that the key-value packet is distinguished from an IP packet. For example, in a frame type field, 0x8040 is used to mark that the packet is a key-value packet.

Figure 3:
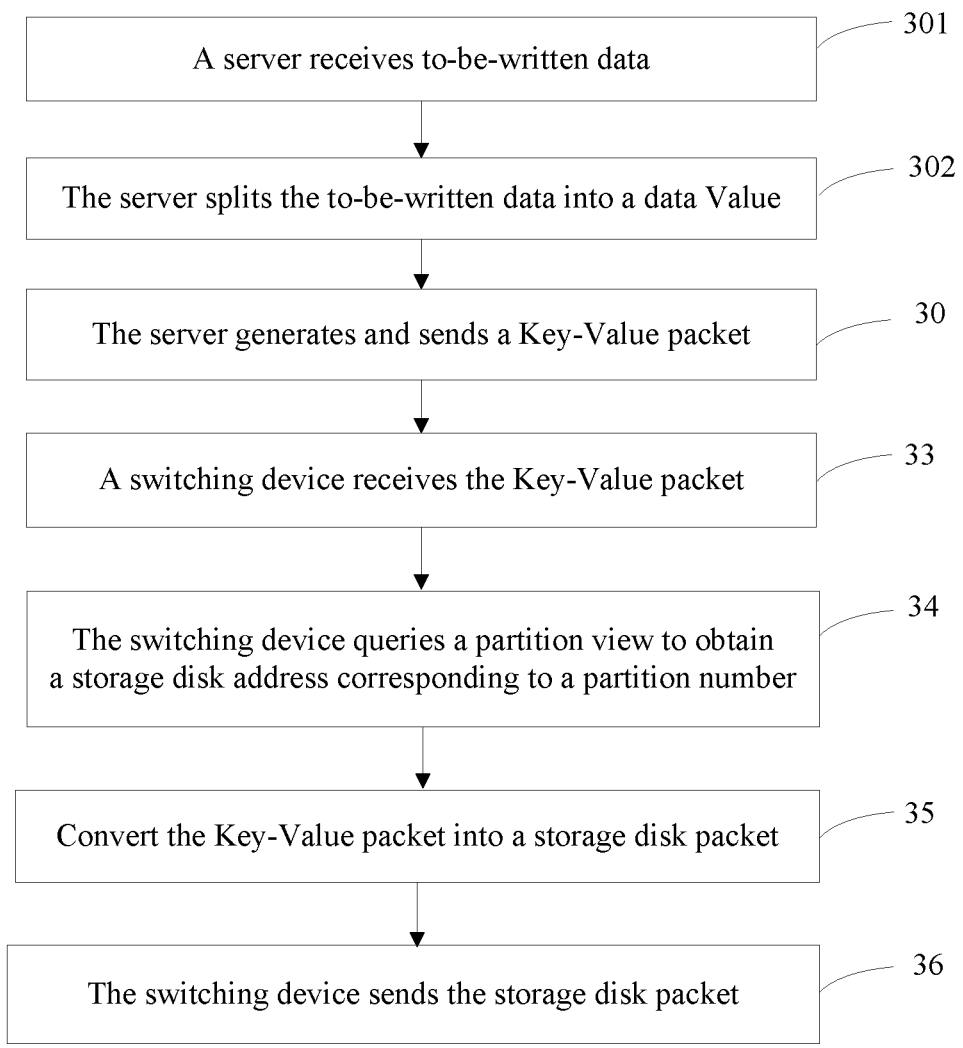
FIG. 3 is a flowchart of a data write method according to an embodiment of the present application.
Figure 4:
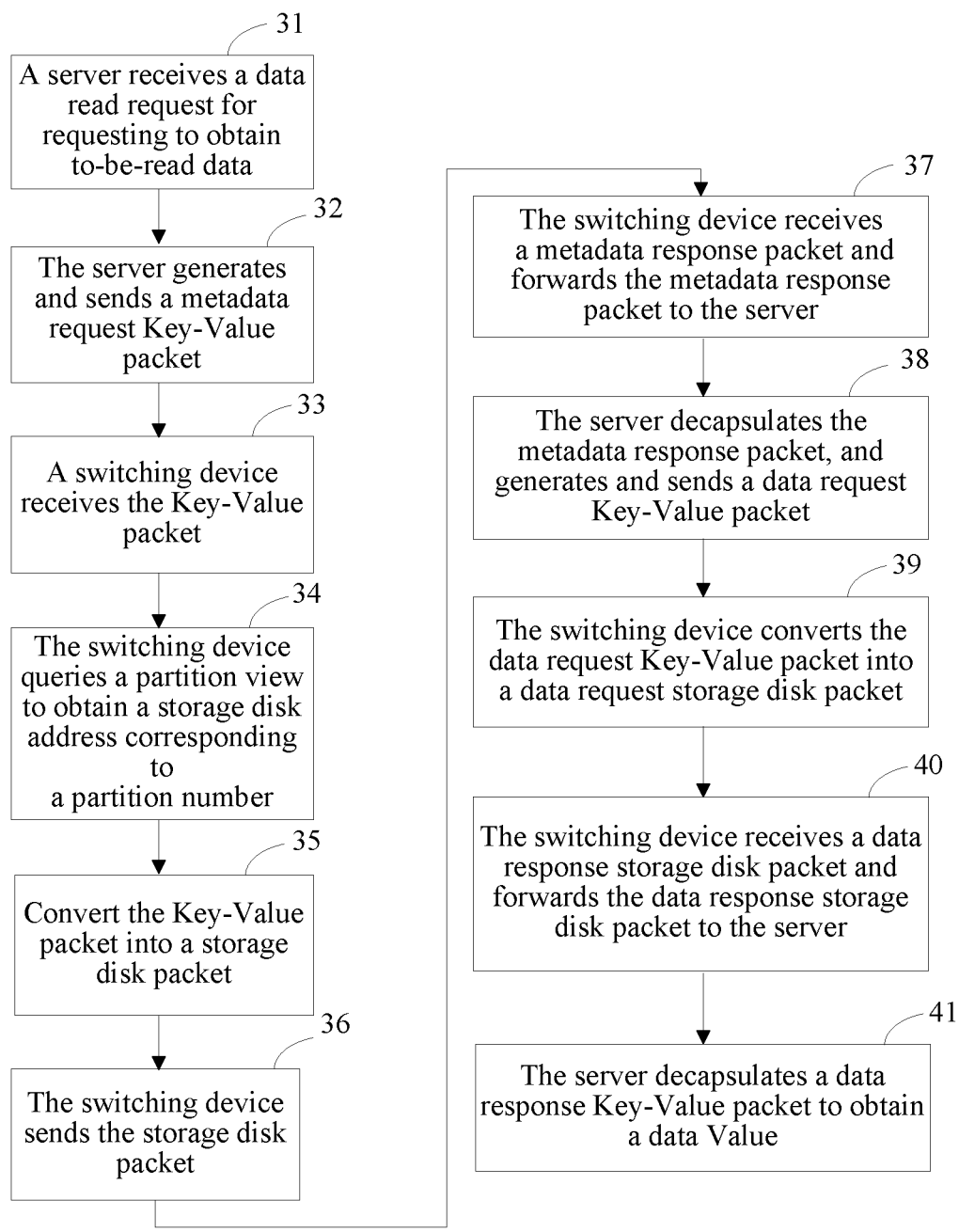
FIG. 4 is a flowchart of a data read method according to an embodiment of the present application.

A data processing method according to another embodiment of the present application is another expression manner of the foregoing method, which includes the following steps 33 to 36 that are performed by a switching device. Refer to FIG. 3 and FIG. 4.

33. The switching device receives a key-value packet, where a destination address of the key-value packet is a partition number.

34. The switching device obtains the partition number from the key-value packet, and queries a partition view to obtain a storage disk address corresponding to the partition number, where a correspondence between the partition number and the storage disk address is recorded in the partition view.

35. Convert the key-value packet into a storage disk packet by changing the destination address of the key-value packet to the storage disk address.

36. The switching device sends the storage disk packet to a storage disk corresponding to the storage disk address.

Step 33 to step 36 are performed by the switching device, and whether step 33 to step 36 are a data writing method or a data reading method is not distinguished.

When step 33 to step 36 are a data writing method, refer to FIG. 3. If the key-value packet is a data key-value packet, before the step that the switching device receives the key-value packet, the method further includes step 30.

30. The server calculates, according to a data key algorithm, a data key corresponding to the data value, obtains a data partition number of the data value according to a partition number algorithm, generates the data key-value packet, and sends the data key-value packet to the switching device, where the destination address of the data key-value packet is the data partition number, and a payload of the data key-value packet carries the data key and the data value.

In step 30, the server calculates, according to a metadata key algorithm, a metadata key corresponding to a metadata value, obtains a metadata partition number of the metadata value according to the partition number algorithm, generates a metadata key-value packet, and sends the metadata key-value packet to the switching device, where a destination address of the metadata key-value packet is the metadata partition number, a payload of the metadata key-value packet carries the metadata key and the metadata value, and the metadata value records index information of the data value. Obtaining the data partition number according to the partition number algorithm includes: performing a taking remainder (REM) operation on a hash value of the data key according to a quantity of partitions, where an obtained value is used as the data partition number.

Based on step 30, the switching device receives the metadata key-value packet, obtains, by querying the partition view, a metadata storage disk address corresponding to a partition number of the metadata value, converts the metadata key-value packet into a metadata storage disk packet by changing the destination address of the metadata key-value packet to the metadata storage disk address, and sends the metadata storage disk packet to a storage disk corresponding to the metadata storage disk address.

Before step 30, the method may further include the following steps 301 and 302:

301. The server receives to-be-written data.

302. The server splits the to-be-written data into one or more data values.

When step 33 to step 36 are a data reading method, refer to FIG. 4. The key-value packet is a metadata request key-value packet, and before the switching device receives the key-value packet, the method further includes steps 31 and 32.

31. The server receives a data read request for requesting to obtain to-be-read data.

32. The server obtains a metadata key of the to-be-read data according to the metadata key algorithm, obtains the metadata partition number according to the partition number algorithm by using the metadata key, generates the metadata request key-value packet, and sends the metadata key-value packet to the switching device, where a destination address of the metadata request key-value packet is the metadata partition number, and the metadata request key-value packet carries the metadata key.

After the switching device sends the storage disk packet to the storage disk corresponding to the storage disk address, the method may further include step 37 to step 41.

37. The switching device receives a metadata response packet, and forwards the metadata response packet to the server, where a payload of the metadata response packet carries a metadata value, and the metadata response packet is a response packet of the storage disk packet.

38. The server decapsulates the metadata response packet, obtains a data key from the metadata value, calculates a data partition number according to the partition number algorithm by using the data key, generates a data request key-value packet, where a destination address of the data request key-value packet is the data partition number and the data request key-value packet carries the data key, and sends the data request key-value packet to the switching device.

39. The switching device receives the data request key-value packet, obtains, by querying the partition view, a storage disk address corresponding to the data partition number, converts the data request key-value packet into a data request storage disk packet by using the storage disk address as the destination address, and sends the data request storage disk packet to a storage disk corresponding to the data value storage disk address.

40. The switching device receives a data response storage disk packet, and forwards the data response storage disk packet to the server, where the data response packet is a response packet of the data request storage disk packet, and the data response packet carries a data value.

41. The server decapsulates the data response key-value to obtain the data value, and combines multiple data values of data keys into the to-be-read data.

In the foregoing steps, the key-value packet marks a packet type by using a frame type field.

Figure 5:
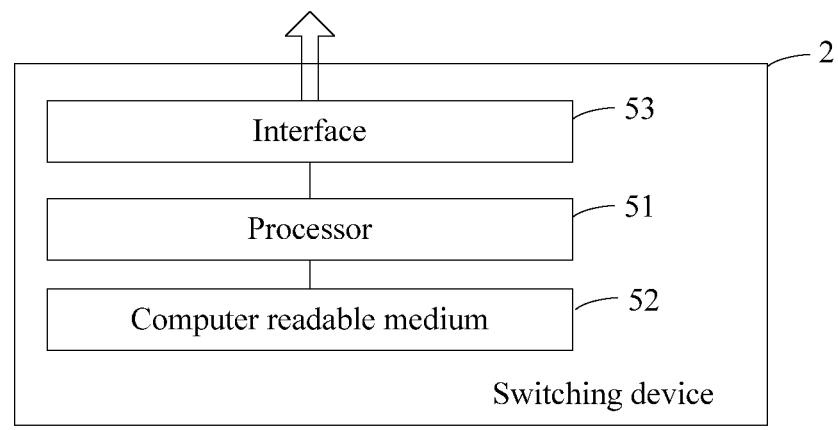
FIG. 5 is a structural diagram of a switching device according to an embodiment of the present application.

The method embodiments of the present application include steps 11-28, steps 301-36, and steps 31-41. It may be learned from the foregoing description that one part of operations is performed by the server, and another part of the operations is performed by the switching device. As shown in FIG. 5, in an embodiment of the present application, a switching device 2 may includes a processor 51, a computer readable medium 52, and an interface 53, where the processor 51 is connected to the computer readable medium 52 and the interface 53 by using a bus. The interface 53 provides an external connection, for example, a connection to a server 1; the computer readable medium 52 is configured to store computer program code; and the processor 51 performs, by running the program code of the computer readable medium 52, operations that the switching device performs in steps 11-28, or operations that the switching device performs in steps 301-36, or operations that the switching device performs in steps 31-41.

The server provided in this embodiment of the present application may include a processor, a storage medium, and an interface, where the processor is connected to the storage medium and the interface. The interface provides an external connection; the storage medium is configured to store computer program code; and the processor performs, by running the program code of the storage medium, operations that the server performs in steps 11-28, or operations that the server performs in steps 301-36, or operations that the server performs in steps 31-41.

Figure 6:
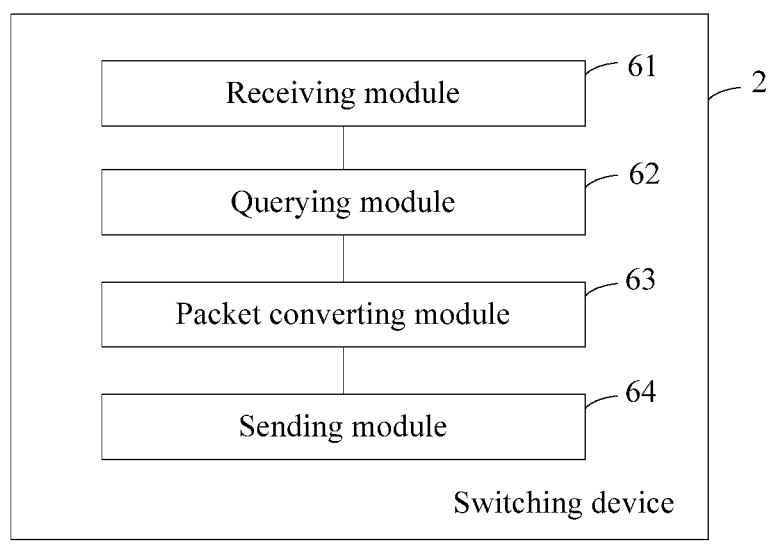
FIG. 6 is a functional block diagram of a switching device according to an embodiment of the present application.

Referring to FIG. 6, a switching device 2 provided in an embodiment of the present application includes a receiving module 61, a querying module 62, a packet converting module 63, and a sending module 64. The switching device 2 can perform the method mentioned above, for example, the operations that the switching device performs in steps 11-28, or the operations that the switching device performs in steps 301-36, or the operations that the switching device performs in steps 31-41.

The receiving module 61 is configured to receive a key-value packet, where a destination address of the key-value packet is a partition number; the querying module 62 is configured to obtain the partition number from the key-value packet, and query a partition view to obtain a storage disk address corresponding to the partition number, where a correspondence between the partition number and the storage disk address is recorded in the partition view; the packet converting module 63 is configured to convert the key-value packet into a storage disk packet by changing the destination address of the key-value packet to the storage disk address; and the sending module 64 is configured to send the storage disk packet to a storage disk corresponding to the storage disk address.

The key-value packet received by the receiving module 61 may be a metadata request key-value packet. Then, the receiving module 61 is further configured to receive a metadata response packet, and forward the metadata response packet to a server 1, where a payload of the metadata response packet carries a metadata value, and the metadata response packet is a response packet of the storage disk packet. The receiving module 61 is further configured to determine a packet type of the key-value packet by reading a frame type field. Because the key-value packet is similar to an IP packet, the frame type field may be used to distinguish the key-value packet from the IP packet.

The key-value packet received by the receiving module 61 may be a data request key-value packet. The switching device 2 and the server 1 jointly construct a data write system in this embodiment of the present application. The server 1 is configured to: calculate, according to a data key algorithm, a data key corresponding to the data value, obtain a data partition number of the data value according to a partition number algorithm, generate the data key-value packet, and send the data key-value packet to the switching device 2, where a destination address of the data key-value is the data partition number, and a payload of the data key-value packet carries the data key and the data value.

The server 1 is further configured to: calculate, according to a metadata key algorithm, a metadata key corresponding to a metadata value, obtain a metadata partition number of the metadata value according to the partition number algorithm, generate a metadata key-value packet, and send the metadata key-value packet to the switching device 2, where a destination address of the metadata key-value packet is the metadata partition number, a payload of the metadata key-value packet carries the metadata key and the metadata value, and the metadata value records index information of the data value. The receiving module 61 is further configured to receive the metadata key-value packet; the querying module 62 is further configured to obtain, by querying the partition view, a metadata storage disk address corresponding to a partition number of the metadata value; the packet converting module 63 is further configured to convert the metadata key-value packet into a metadata storage disk packet by changing the destination address of the metadata key-value packet to the metadata storage disk address; and the sending module 64 is further configured to send the metadata storage disk packet to a storage disk corresponding to the metadata storage disk address.

Optionally, the server is further configured to: before processing a data value, receive to-be-written data, and split the to-be-written data into a data value.

Optionally, the obtaining a partition number of the data value according to a partition number algorithm specifically includes: performing, by the server 1, a REM operation on a hash value of the data key according to a quantity of partitions, where an obtained value is used as a data partition number.

Similarly, the server 1 is configured to perform a part that relates to the server in the foregoing method, for example, the operations that the server performs in steps 11-28, or the operations that the server performs in steps 301-36, or the operations that the server performs in steps 31-41.

The following introduces the data write system in this embodiment of the present application from another perspective. The data write system includes a server 1 and a switching device 2.

The server 1 is configured to: calculate, according to a data key algorithm, a data key corresponding to the data value, obtain a data partition number of the data value according to a partition number algorithm, generate the data key-value packet, and send the data key-value packet to the switching device, where a destination address of the data key-value packet is the data partition number, and a payload of the data key-value packet carries the data key and the data value.

The switching device 2 is connected to the server 1, and is configured to receive a key-value packet sent by the server 1. The switching device 2 is further configured to obtain the data partition number from the data key-value packet, and query a partition view to obtain a data storage disk address corresponding to the partition number, where a correspondence between the data partition number and the data storage disk address is recorded in the partition view.

The switching device 2 is further configured to convert the data key-value packet into a data storage disk packet by changing the destination address of the data key-value packet to the data storage disk address; and the switching device 2 is further configured to send the data storage disk packet to a data storage disk 3 corresponding to the data storage disk address.

Optionally, the server 1 is further configured to: calculate, according to a metadata key algorithm, a metadata key corresponding to a metadata value, obtain a metadata partition number of the metadata value according to the partition number algorithm, generate a metadata key-value packet, and send the metadata key-value packet to the switching device 2, where a destination address of the metadata key-value packet is the metadata partition number, a payload of the metadata key-value packet carries the metadata key and the metadata value, and the metadata value records index information of the data value. Optionally, the switching device 2 is further configured to: receive the metadata key-value packet, obtain, by querying the partition view, a metadata storage disk address corresponding to a partition number of the metadata value, convert the metadata key-value packet into a metadata storage disk packet by changing the destination address of the metadata key-value packet to the metadata storage disk address, and send the metadata storage disk packet to a storage disk 3 corresponding to the metadata storage disk address.

The following describes a storage system from still another perspective, where the storage system includes a switching device 2 and a server 1. The server 1 is configured to: calculate, according to a data key algorithm, a data key corresponding to the data value, obtain a data partition number of the data value according to a partition number algorithm, generate the data key-value packet, and send the data key-value packet to the switching device, where a destination address of the data key-value packet is the data partition number, and a payload of the data key-value packet carries the data key and the data value.

The switching device 2 is connected to the server 1, and is configured to: receive the data key-value packet; obtain the data partition number from the data key-value packet, and query a partition view to obtain a data storage disk address corresponding to the data partition number, where a correspondence between the partition number and the data storage disk address is recorded in the partition view; convert the data key-value packet into a data storage disk packet by changing the destination address of the data key-value packet to the data storage disk address; and send the data storage disk packet to a data storage disk 3 corresponding to the data storage disk address.

A person of ordinary skill in the art may understand that, each aspect of the present application or a possible implementation manner of each aspect may be specifically implemented as a system, a method, or a computer program product. Therefore, each aspect of the present application or the possible implementation manner of each aspect may use forms of hardware only embodiments, software only embodiments (including firmware, resident software, and the like), or embodiments with a combination of software and hardware, which are collectively referred to as "circuit", "module", or "system" herein. In addition, each aspect of the present application or the possible implementation manner of each aspect may use a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; and an apparatus is generated to implement a function and an action specified in each block or a combination of blocks in a block diagram.

What is claimed is:

1. A method, comprising:
receiving, by a switching device via a networking interface, a key-value packet from a server, wherein a destination address of the key-value packet is a partition number, wherein the key-value packet comprises a key and a value, and wherein the partition number is generated based on the key or the value of the keys-value packet according to a partition number algorithm;
querying, by the switching device, a partition view to obtain a storage disk address corresponding to the partition number, wherein a correspondence between the partition number and the storage disk address is recorded in the partition view, wherein the partition view is stored on the switching device, and wherein the storage disk address is an address recognized by a storage disk;
converting, by the switching device, the key-value packet into a storage disk packet by changing the destination address of the key-value packet to the storage disk address, wherein the storage disk packet is an Internet Protocol (IP) packet and the storage disk address is an IP address; and
sending, by the switching device, the storage disk packet to the storage disk corresponding to the storage disk address.

2. The method according to claim 1,
wherein the key-value packet is a data key-value packet, and
wherein the destination address of the data key-value packet is a data partition number, and a payload of the data key-value packet carries a data key and a data value.

3. The method according to claim 2,
wherein the data key-value packet is associated with a metadata key-value packet, and
wherein a destination address of the metadata key-value packet is a metadata partition number, a payload of the metadata key-value packet carries a metadata key and a metadata value, and the metadata value records index information of the data value in the payload of the data key-value packet.

4. The method according to claim 3, further comprising:
receiving, by the switching device, the metadata key-value packet;
querying, by the switching device, the partition view to obtain a metadata storage disk address corresponding to the metadata partition number;
converting, by the switching device, the metadata key-value packet into a metadata storage disk packet by changing the destination address of the metadata key-value packet to the metadata storage disk address, wherein the metadata storage disk packet is an Internet Protocol (IP) packet and the metadata storage disk address is an IP address; and
sending, by the switching device, the metadata storage disk packet to the storage disk corresponding to the metadata storage disk address.

5. The method according to claim 2, wherein the data partition number is based on a hash value of the data key.

6. The method according to claim 1, wherein the key-value packet received by the switching device is a metadata request key-value packet, wherein a destination address of the metadata request key-value packet is a metadata partition number, and the metadata request key-value packet carries a metadata key.

7. The method according to claim 6, wherein the method further comprises:
receiving, by the switching device, a metadata response packet; and
forwarding, by the switching device, the metadata response packet to the server,
wherein a payload of the metadata response packet carries a metadata value, and the metadata response packet is a response packet of the storage disk packet.

8. The method according to claim 1, further comprising:
receiving, by the switching device, a data request key-value packet;
querying, by the switching device, the partition view to obtain a storage disk address corresponding to a data partition number, wherein a destination address of the data request key-value packet is the data partition number, and the data request key-value packet carries a data key;
converting, by the switching device, the data request key-value packet into a data request storage disk packet by using the storage disk address as a destination address of the data request storage disk packet, wherein the data request storage disk packet is an Internet Protocol (IP) packet and the storage disk address is an IP address; and
sending, by the switching device, the data request storage disk packet to the storage disk corresponding to the storage disk address.

9. The method according to claim 8, further comprising:
receiving, by the switching device, a data response storage disk packet; and
forwarding, by the switching device, the data response storage disk packet to the server,
wherein the data response storage disk packet is a response packet of the data request storage disk packet, and the data response storage disk packet carries a data value.

10. The method according to claim 1, wherein the key-value packet is identified in a frame type field of the packet.

11. A system, comprising:
a server, and
a switching device connected to the server,
wherein the server is configured to:
calculate, according to a data key algorithm, a data key corresponding to a data value,
obtain a data partition number of the data value according to a partition number algorithm,
generate a data key-value packet, and
send the data key-value packet to the switching device, wherein a destination address of the data key-value packet is the data partition number, and a payload of the data key-value packet carries the data key and the data value; and
wherein the switching device is configured to:
receive the data key-value packet from the server,
query a partition view to obtain a storage disk address corresponding to the data partition number, wherein a correspondence between the data partition number and the storage disk address is recorded in the partition view, wherein the partition view is stored on the switching device, and wherein the storage disk address is an address recognized by a storage disk,
convert the data key-value packet into a storage disk packet by changing the destination address of the data key-value packet to the storage disk address, wherein the storage disk packet is an Internet Protocol (IP) packet and the storage disk address is an IP address, and send the storage disk packet to the storage disk corresponding to the storage disk address.

12. The system according to claim 11, wherein the server is further configured to:

calculate, according to a metadata key algorithm, a metadata key corresponding to a metadata value, obtain a metadata partition number of the metadata value according to the partition number algorithm, generate a metadata key-value packet, and send the metadata key-value packet to the switching device, wherein a destination address of the metadata key-value packet is the metadata partition number, a payload of the metadata key-value packet carries the metadata key and the metadata value, and the metadata value records index information of the data value in the payload of the data key-value packet.

13. The system according to claim 12, wherein the switching device is further configured to:

receive the metadata key-value packet, obtain, by querying the partition view, a metadata storage disk address corresponding to a partition number of the metadata value, convert the metadata key-value packet into a metadata storage disk packet by changing the destination address of the metadata key-value packet to the metadata storage disk address, wherein the metadata storage disk packet is an Internet Protocol (IP) packet and the metadata storage disk address is an IP address; and send the metadata storage disk packet to the storage disk corresponding to the metadata storage disk address.

14. The system according to claim 11, wherein before the server obtains the data key corresponding to the data value according to the data key algorithm, the server is further configured to:

receive an amount of data; and split the data into one or more data values, wherein a data key-value packet is generated for each data value.

15. The system according to claim 11, wherein obtaining the partition number of the data value according to the partition number algorithm comprises:

performing a taking remainder (REM) operation on a hash value of the data key according to a quantity of partitions, wherein an obtained value of the performing is used as the data partition number.

16. A switching device, comprising:

a networking interface, configured to provide an external connection to a server;

a computer readable medium, configured to store program instructions; and a processor, by executing the program instructions, configured to perform a process that comprises:

receiving a key-value packet from the server, wherein a destination address of the key-value packet is a partition number, wherein the key-value packet comprises a key and a value, and wherein the partition number is generated based on the key or the value of the value packet according to a partition number algorithm;

querying a partition view to obtain a storage disk address corresponding to the partition number, wherein a correspondence between the partition number and the storage disk address is recorded in the partition view, wherein the partition view is stored on the switching device, and wherein the storage disk address is an address recognized by a storage disk;

converting the key-value packet into a storage disk packet by changing the destination address of the key-value packet to the storage disk address, wherein the storage disk packet is an Internet Protocol (IP) packet and the storage disk address is an IP address; and sending the storage disk packet to the storage disk corresponding to the storage disk address.

17. The switching device according to claim 16, wherein the key-value packet is a data key-value packet, and the process further comprises:

receiving a metadata key-value packet, querying the partition view to obtain a metadata storage disk address corresponding to a partition number of a metadata value, converting the metadata key-value packet into a metadata storage disk packet by changing a destination address of the metadata key-value packet to the metadata storage disk address, wherein the metadata storage disk packet is an Internet Protocol (IP) packet and the metadata storage disk address is an IP address, and sending the metadata storage disk packet to the storage disk corresponding to the metadata storage disk address.

18. The switching device according to claim 16, wherein the key-value packet is a metadata request key-value packet, and the process further comprises:

receiving a metadata response packet, and forwarding the metadata response packet to the server, wherein a payload of the metadata response packet carries a metadata value, and the metadata response packet is a response packet of the storage disk packet.

19. The switching device according to claim 16, wherein the process further comprises:

determining whether a received packet is a key-value packet by reading a frame type field of the packet.

20. The method according to claim 1, wherein the switching device is separate from and not included in the server or a storage disk.

21. The method according to claim 1, further comprising:

updating, by the switching device, the partition view in response to adding or deleting at least one storage disk.

* * * * *